(12) United States Patent
Kirby et al.

(10) Patent No.: US 8,756,948 B2
(45) Date of Patent: Jun. 24, 2014

(54) SYSTEM AND METHOD FOR CONDITIONING AIR

(75) Inventors: Joseph K. Kirby, Chicago, IL (US); Victor M. Menendez, Carrollton, TX (US)

(73) Assignee: EcoMePlease, LLC, Fort Worth, TX (US)

( * ) Notice: Subject to any disclaimer, the term of this patent is extended or adjusted under 35 U.S.C. 154(b) by 657 days.

(21) Appl. No.: 12/686,696

(22) Filed: Jan. 13, 2010

(65) Prior Publication Data
US 2011/0172832 A1 Jul. 14, 2011

(51) Int. Cl.
*F25B 27/00* (2006.01)
*F25B 25/00* (2006.01)
*F25B 7/00* (2006.01)

(52) U.S. Cl.
USPC ............. 62/236; 62/235.1; 62/332; 62/175

(58) Field of Classification Search
USPC ................... 62/236, 235.1, 332, 175
See application file for complete search history.

(56) References Cited

U.S. PATENT DOCUMENTS

| | | | | |
|---|---|---|---|---|
| 4,304,103 A * | 12/1981 | Hamrick et al. | ............. | 62/228.1 |
| 5,197,291 A * | 3/1993 | Levinson | ............. | 62/3.2 |
| 5,353,601 A * | 10/1994 | Palmer | ............. | 62/171 |
| 5,975,192 A * | 11/1999 | Moratalla et al. | ............. | 165/45 |
| 6,469,487 B2 * | 10/2002 | Ewert et al. | ............. | 62/228.4 |
| 6,681,584 B1 * | 1/2004 | Conner | ............. | 62/171 |
| 6,813,897 B1 * | 11/2004 | Bash et al. | ............. | 62/175 |
| 7,743,620 B1 * | 6/2010 | Severson | ............. | 62/259.4 |
| 2004/0069001 A1 * | 4/2004 | Taylor et al. | ............. | 62/238.1 |
| 2005/0278070 A1 * | 12/2005 | Bash et al. | ............. | 700/276 |
| 2006/0260335 A1 * | 11/2006 | Montuoro et al. | ............. | 62/236 |
| 2007/0145160 A1 * | 6/2007 | Martin | ............. | 236/49.3 |
| 2008/0041970 A1 * | 2/2008 | Hagentoft | ............. | 236/44 A |
| 2008/0216497 A1 * | 9/2008 | Wellman | ............. | 62/160 |

OTHER PUBLICATIONS

Parker et al., "Performance Assessment of Photovoltaic Attic Ventilator Fans," FSEC-GP-171-00, *Florida Solar Energy Center*, May 15, 2000, 9 pages.
"Conditioning Air in the Humid South—Creating Comfort and Controlling Cost," Research Report 0214, *Building Science Corporation*, Nov. 2002, 23 pages.
Stewart, "Attic Ventilation for Homes," http://www.factsfacts.com/MyHomeRepair/ventilation.htm, date unknown, 6 pages.
"Ductless, Mini-Split Air Conditioners," *U.S. Dept. of Energy*, Dec. 30, 2008, 3 pages.

* cited by examiner

*Primary Examiner* — Frantz Jules
*Assistant Examiner* — Joseph Trpisovsky
(74) *Attorney, Agent, or Firm* — Baker Botts L.L.P.

(57) ABSTRACT

A system for conditioning air in a structure includes a first conditioning system and a second conditioning system. The first conditioning system is capable of supplying conditioned air to a first space of the structure. The first space is enclosed, at least in part, by one or more external walls. The second conditioning system is capable of supplying conditioned air to a second space of the structure that is located above the first space. The second space is enclosed, at least in part, by a roof that is sealed to prevent a flow of air between the second space and an outside environment. The first space and the second space are separated by a ceiling that permits thermal energy to pass between the first space and the second space.

11 Claims, 3 Drawing Sheets

SYSTEM AND METHOD FOR CONDITIONING AIR

TECHNICAL FIELD

This disclosure relates, in general, to air-conditioning systems and, more particularly, to a system and method for energy-efficient air-conditioning within a residential building or other structure.

BACKGROUND

Cooling, heating, and other forms of air-conditioning are a significant source of power consumption in many structures, especially homes and other residential buildings. In hot, humid climates, the amount of energy consumed by residential air-conditioning systems can be quite substantial. As a result, air-conditioning solutions that minimize the use of conventional air-conditioning systems or that utilize renewable energy sources can provide both environmental and cost benefits.

SUMMARY OF EXAMPLE EMBODIMENTS

In accordance with certain of the various embodiments described or suggested by the present disclosure, disadvantages and problems associated with air-conditioning systems have been substantially reduced or eliminated.

In accordance with one embodiment, a system for conditioning air in a structure includes a first conditioning system and a second conditioning system. The first conditioning system is capable of supplying conditioned air to a first space of a structure. The first space is enclosed, at least in part, by one or more external walls. The second conditioning system is capable of supplying conditioned air to a second space of the structure that is located above the first space. The second space is enclosed, at least in part, by a roof that is sealed to prevent a flow of air between the second space and an outside environment. The first space and the second space are separated by a ceiling that permits thermal energy to pass between the first space and the second space.

In accordance with another embodiment, a method for conditioning air in a structure includes activating a first conditioning system operable to supply conditioned air to a first space of a structure. The first space is enclosed, at least in part, by one or more external walls. The method also includes activating a second conditioning system operable to supply conditioned air to a second space of the structure located above the first space. The second space is enclosed, at least in part, by a roof that is sealed to prevent a flow of air between the second space and an outside environment. The first space and the second space are separated by a ceiling that permits thermal energy to pass between the first space and the second space.

In accordance with yet another embodiment, a method for installing an air-conditioning system includes fluidly connecting a first conditioning system to a first space of a structure, fluidly connecting a second conditioning system to a second space of the structure located above the first space, and sealing a roof to prevent a flow of air between the second space and an outside environment. In this structure, the first space is enclosed, at least in part, by one or more external walls and the second space is enclosed, at least in part, by a roof that is sealed to prevent a flow of air between the second space and an outside environment. Additionally, the first space and the second space are separated by a ceiling that permits thermal energy to pass between the first space and the second space.

Technical advantages of certain embodiments include the ability to improve the efficiency of heating, cooling, and other air-conditioning systems in residential buildings and other structures. Furthermore, particular embodiments provide for an attic space that is sealed to facilitate conditioning, inhibit the growth of mold or mold spores, and limit decay from heat and moisture. Certain embodiments may also utilize renewable energy sources to power such air conditioning. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
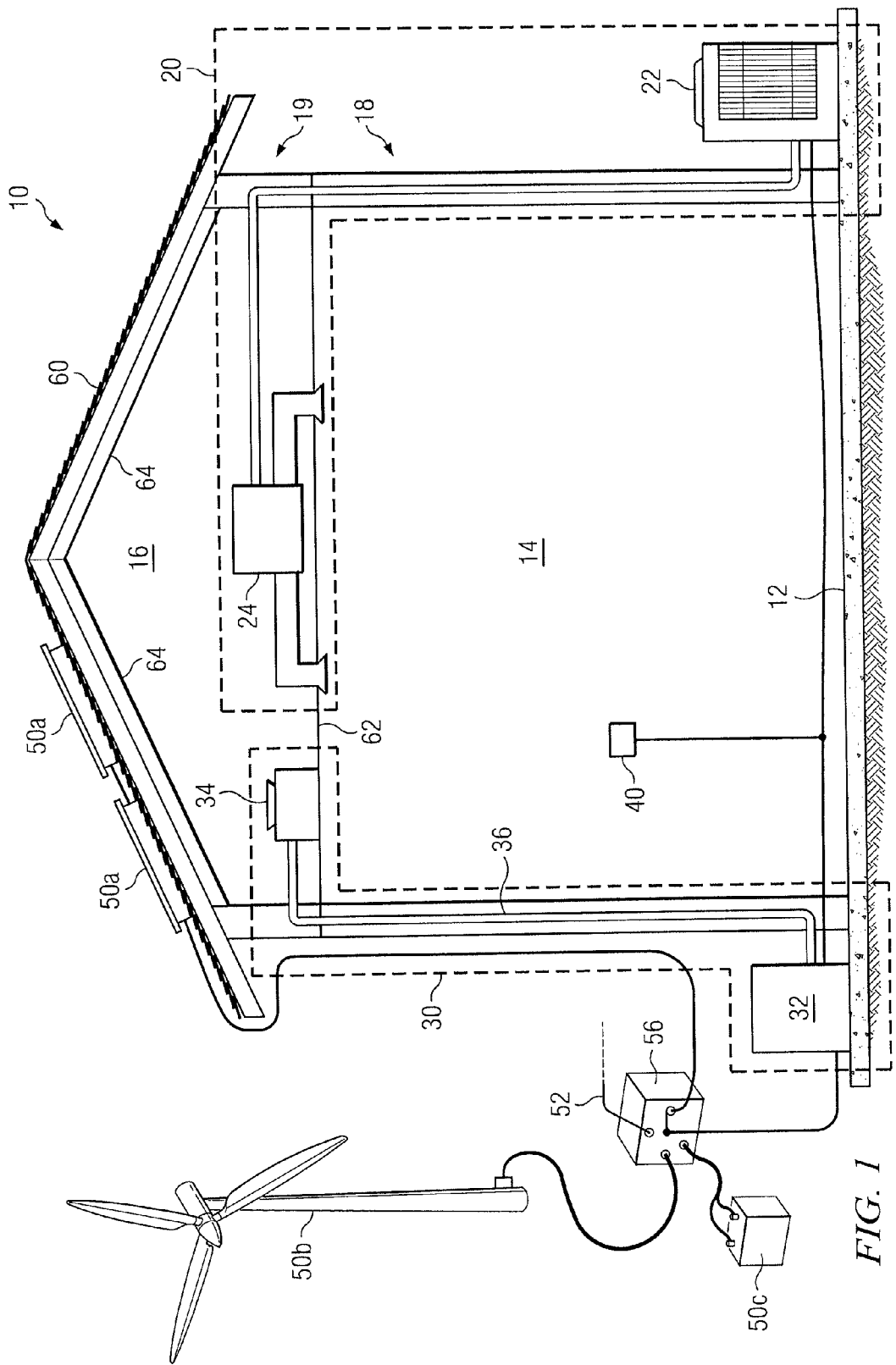
FIG. 1 illustrates a particular embodiment of an air-conditioning system.

FIG. 1 illustrates a particular embodiment of an air-conditioning system 10 for conditioning air in a structure 12. The illustrated embodiment of air-conditioning system 10 includes a main conditioning system 20, a secondary conditioning system 30, a control module 40, and one or more alternative power supplies 50. Structure 12 is divided into a first space 14 and a second space 16. Main conditioning system 20 is responsible for conditioning air in first space 14, while secondary conditioning system 30 is responsible for conditioning air in second space 16. By utilizing secondary conditioning system 30 to condition air in second space 16, particular embodiments of air-conditioning system 10 may be capable of conditioning first space 14 using a main conditioning system 20 that is smaller, that is less powerful, and/or that consumes less power than otherwise would be suitable for conditioning first space 14.

In a conventional structure, an attic space is typically unsealed and enclosed by roofs and/or external walls having numerous vents or other openings. These openings can result in significant airflow between the attic and the outside environment. As a result, air in the attic of a conventional structure cannot be effectively conditioned, as conditioned air would quickly escape from the attic and be replaced by unconditioned air from outside. Because of this, a conventional structure typically does not include a conditioning system for its attic, and attic air is typically not conditioned.

Instead, the ceiling between the attic and any inhabited spaces in a conventional structure is often insulated to prevent thermal energy from passing between the unconditioned air in the attic and the conditioned air in the inhabited areas of the structure. Nonetheless, this insulated ceiling can trap hot air rising up through the inhabited area and hinder cooling or other conditioning that may be desirable for the inhabited area of the structure. Additionally, because lighting fixtures, vents, wiring, and other components are often installed on or in the ceiling of conventional structures, the ceiling often has numerous breaches and holes. Gaps around vents, light fixtures, and wires, and even those around nails and screws, can allow for a significant amount of pollutants, allergens, and moisture to seep into inhabited areas of conventional structures. The pollutants, allergens, and moisture can penetrate into the attic space and further hinder attempts to condition air in inhabited areas of conventional structures. As a result, air-conditioning systems in conventional structures are often sized larger to compensate for these breaches and holes, resulting in significant long-term energy consumption and a greater initial cost for the air conditioning equipment.

Additionally, because the attic in a conventional structure is typically not air-conditioned, the unconditioned air circulating in such an attic can create numerous problems. Moisture from outside air can provide favorable conditions for the formation and accumulation of mold and can accelerate structural decay. Similarly, excessively hot air in an unconditioned attic space can result in accelerated deterioration to shingles and other roofing materials. Additionally, heat, allergen, and pollutants can create unsafe or uncomfortable environment if the attic is entered for maintenance or inspection or if the attic is used for storage or other purposes. Furthermore, while these problems are described, for purposes of example, with respect to conditions in the attic and inhabited spaces of a conventional home, similar concerns may arise in any analogously-situated spaces in a structure of any type.

However, in particular embodiments described by the present disclosure, air-conditioning system 10 is installed in a structure such as structure 12 in which roof 60 and any external walls (such as the illustrated external walls 19) that enclose second space 16 are sealed and insulated. As a result, there may be limited or no air flow between second space 16 and the outside environment. As a result, secondary conditioning system 30 can be used to effectively condition air in second space 16 with minimal loss of conditioned air to the outside environment and minimal influx of unconditioned outside air.

Additionally, second space 16 and first space 14 of structure 12 may be separated by a ceiling 62 that allows conditioned air and/or thermal energy to pass between second space 16 and first space 14. In particular embodiments, ceiling 62 may be substantially free of insulating material, permitting heat from air in first space 14 to pass through ceiling 62. Thus, in particular embodiments, ceiling 62 may consist of materials having a thermal resistance, or R-value, less than 45 $ft^2 \cdot F \cdot h/Btu$, a typical resistance for conventional insulating material. Moreover, in certain embodiments, ceiling 62 may consist of materials having significantly lower R-values (e.g., R-values less than or equal to 5 $ft^2 \cdot F \cdot h/Btu$) to further facilitate the passage of thermal energy between first space 14 and second space 16.

In addition, openings may exist in ceiling 62 through which air may pass between second space 16 and first space 14. For example, gaps around fixtures such as vents and recessed lighting fixtures may permit air to pass between second space 16 and first space 14. Under certain circumstance, this transfer of air results in relatively cooler air in second space 16 flowing into first space 14 and replacing relatively warmer air in first space 14. Thus, conditioning of air in second space 16 can facilitate conditioning of air in first space 14. As a result, particular embodiments of air-conditioning system 10 may reduce or eliminate many of the above problems when installed in such a structure as structure 12 illustrated in FIG. 1.

Turning to the embodiment illustrated in FIG. 1, structure 12 represents a house or other building in which air-conditioning system 10 may be installed. Structure 12 is divided into multiple sections including first space 14 and second space 16. Although, for purposes of simplicity, structure 12 is shown as having only two sections, structure 12 may divided into any appropriate number of sections. Such additional sections may be conditioned by main conditioning system 20 or secondary conditioning system 30 or may be associated with and conditioned by additional conditioning systems. Although structure 12 may represent any type of building or other structure, particular embodiments of air-conditioning system 10 may be especially well suited for installation in residential buildings due to conventional construction methods, and the typical building codes that regulate these methods.

First space 14 represents a living space or other portion of structure 12 suitable for inhabitation. For example, in various embodiments, first space 14 may represent the ground floor of a one-story house, or the ground and second floor of a two-story house. Although the description below focuses on an embodiment in which first space 14 represents a space suitable for inhabitation by humans, first space 14 may represent an area suitable for storage of animals (such as a holding area for livestock in a barn), an area suitable for storage of food items (such as a refrigerated area of a warehouse), or any other area suited for uses that may benefit from air conditioning of any type. First space 14 is enclosed by a plurality of external walls 18.

Second space 16 represents an attic in a residential home or another area separating first space 14 from one or more external surfaces of structure 12, such as roof 60. In particular embodiments, second space 16 is situated above first space 14. Second space 16 is enclosed, at least in part, by roof 60 and ceiling 62, which second space 16 shares with first space 14. In particular embodiments, second space 16 may also be enclosed, in part, by external walls (such as the illustrated external walls 19). Second space 16 is sealed to prevent air flow between second space 16 and the outside environment external to structure 12. Additionally, insulating material 64 is attached to or incorporated into roof 60 and any external walls 19 enclosing second space 16 to limit the ability of roof 60 and any external walls 19 to transfer heat.

Insulating material 64 represents any material capable of impeding heat transfer through roof 60 and any external walls 19 of second space 16. Although insulating material 64 may comprise any material capable of impeding heat transfer, in particular embodiments, insulating material 64 comprises material having a thermal resistance, or R-value, greater than 45 $ft^2 \cdot F \cdot h/Btu$. Additionally, insulating material 64 may represent material formed and/or applied in any appropriate manner, including conventional fiberglass panels.

In particular embodiments, the use of spray foam insulation as insulating material 64 may be particularly advantageous, as spray foam insulation is well-suited for application in the crevices, cracks, and other irregularities that may be common in second space 16 and that may be difficult to fully cover with other types of insulation. Additionally, because spray foam insulation may initially be applied as a liquid or semi-malleable solid, spray foam insulation can fill cracks, holes, and other breaches in roof 60 and any external walls 19 enclosing second space 16. As a result, spray foam insulation may aid in sealing second space 16. Additionally, because the use of spray foam insulation may eliminate the need for nails or other fasteners when insulating material 64 is installed, spray foam insulation may also prevent additional holes from being formed in roof 60 and any external walls 19 enclosing second space 16.

Main conditioning system 20 represents a system for cooling, heating, filtering, humidifying, de-humidifying, and/or otherwise conditioning air in first space 14. Main conditioning system 20 may represent or include any appropriate combination of compressors or other components for providing a supply of flowing air; cooling or heating coils, burners, or filters or other components for conditioning air; and/or blowers, fans, ducts, or other components for distributing air throughout first space 14. In particular embodiments, main conditioning system 20 may represent a conventional residential air-conditioning system, such as any air cooled, forced, air conditioning system. In the illustrated example, main conditioning system 20 includes a compressor 22 and an air distribution duct 24.

Secondary conditioning system 30 represents a system for cooling, heating, filtering, humidifying, de-humidifying, and/or otherwise conditioning air in second space 16. Secondary conditioning system 30 may include compressors or other components for providing a supply of flowing air; cooling or heating coils, burners, ducts for distributing air throughout second space 16, and/or components suitable to condition air or distribute the conditioned air throughout second space 16. In particular embodiments, secondary conditioning system 30 may represent a conditioning system similar or identical to main conditioning system 20. However, in certain embodiments, secondary conditioning system 30 may represent a scalable system that can be zoned and optimally sized, such as a ductless, multi-zoned, mini-split air conditioning system. The ability to optimally size secondary conditioning system 30 for second space 16 may allow air-conditioning system 10 to be designed with reduced cooling capacity, which reduces initial cost and provides potential long-term energy savings. In the illustrated example, secondary conditioning system 30 includes a compressor 32 and an air-handling unit 34, connected by a conduit 36. Conduit 36 houses a power cable, refrigeration tubing, suction tubing, and a condensate drain.

Alternative power supplies 50 represent power supplies from which secondary conditioning system 30 may draw power as an alternative to a public power grid connection 52. In various embodiments, alternative power supplies 50 may fully replace power from the public power grid, selectively replace power from the public power grid (e.g., at certain times of day), or supplement power drawn from the public power grid. In particular embodiments, alternative power supplies 50 are located local to structure 12. Additionally, in particular embodiments, alternative power supplies may supply power from renewable power sources, such as solar, water, wind, and geothermal energy. Furthermore, in particular embodiments, power from alternative power supplies 50 may be stored locally by air-conditioning system 10. Therefore, in the illustrated embodiment, air-conditioning system 10 includes an alternative power supply 50a comprising solar panels, an alternative power supply 50b comprising a wind turbine, and an alternative power supply 50c comprising a battery. In this example, surplus power collected by solar panels 50a and wind turbine 50b is stored in battery 50c for later use by air-conditioning system 10. In particular embodiments, the use of solar power collected by solar panels local to structure 12 may be especially beneficial considering the amount of cooling needed to maintain a particular temperature in second space 16 will depend on the amount of sunlight incident on structure 12, and thus, on the solar panels. As a result, such embodiments may have additional power available when the need for air-conditioning is greatest.

In particular embodiments, various types of alternative power supplies 50 may be included as part of air-conditioning system 10 to ensure that power is collected and available under a wide range of different operating conditions. For example, air-conditioning system 10 may include a solar panel for collecting solar energy during the day when sunlight is typically abundant and a wind turbine for collecting wind during the evening and nighttime when sunlight is not available. As a result, particular embodiments of air-conditioning system 10 may be configured to operate without or with minimal reliance on the public power grid.

Control module 40 controls operation of air-conditioning system 10. In particular embodiments, control module 40 receives input from users and/or sensors and manages the operation of air-conditioning system 10 based on this input. Control module 40 may couple to and/or communicate with sensors or other components for detecting conditions or events related to the operation of air-conditioning system 10 (such as temperature and humidity detectors, light sensors, wind sensors, or battery-level detectors); user input components that allow a user to manage or affect operation of air-conditioning system 10 (such as keypads, dials, and toggle switches); and electrical or mechanical components that allow control module 40 to activate, operate, or otherwise control components of main conditioning system 20, secondary conditioning system 30, and alternative power supplies 50. Depending on the configuration of air-conditioning system 10, control module 40 may represent a single component or multiple, separate physical components located throughout structure 12. The contents of a particular embodiment of control module 40 is described in further detail below with respect to FIG. 2.

In operation, main conditioning system 20 conditions air in first space 14 and secondary conditioning system 30 conditions air in second space 16. As noted above, this conditioning may include heating, cooling, humidity control, filtration, and/or other types of conditioning that change any appropriate properties of the relevant air. For example, in particular embodiments, a compressor 22 of main conditioning system 20 cools air and a duct system 24 of main conditioning system 20 distributes the cooled air to one or more locations in first space 14, while a compressor 32 and air-handling unit 34 of secondary conditioning system 30 cool and distribute air to locations in second space 16.

In embodiments of air-conditioning system 10 that provide cooling, the conditioning of air in second space 16 can result in relatively cooler attic air that descends towards the bottom of second space 16. Meanwhile relatively hotter air in first space 14 will rise to the top of first space 14. Because ceiling 62 includes minimal or no insulating material, ceiling 62 will only minimally impede the transfer of heat between second space 16 and first space 14. As a result, thermal energy will be transferred between the warmer air on the first-space side of ceiling 62 and the cooler air on the second-space side of ceiling 62. Additionally, because ceiling 62 may still have numerous openings through which air may pass, cooler air collecting at the bottom of second space 16 may flow through such holes into first space 14. Both of these effects may assist in cooling first space 14.

Secondary conditioning system 30 may additionally or alternatively be capable of performing other types of conditioning to air in second space 16 apart from cooling, such as filtration and humidity control. Because airflow can occur between second space 16 and first space 14 through the numerous openings in ceiling 62, other types of conditioning performed by secondary conditioning system 30 may aid any similar conditioning performed by main conditioning system 20 to the air in first space 14.

Consequently, secondary conditioning system's ability to enhance conditioning of air in first space 14 may provide multiple benefits to the design and operation of main conditioning system 20. Depending on the configuration of main conditioning system 20, a smaller capacity main conditioning system 20 may be installed in structure 12 or the installed main conditioning system 20 may need to be activated less frequently to cool first space 14. As a result, secondary conditioning system 30 may reduce the energy consumption and expense associated with main conditioning system 20.

Additionally, the structure and preparation of second space 16 and the conditioning performed by secondary conditioning system 30 may have added benefits for second space 16. For example, sealing second space 16 and using secondary conditioning system 30 to control the humidity level of the air in second space 16 may prevent the growth of mold and inhibit moisture-related decay. Similarly, conditioning air in second space 16 may make second space 16 safer and more comfortable when entered for maintenance, inspection, or other purposes.

In particular embodiments of air-conditioning system 10, control module 40 manages the operation of main conditioning system 20, secondary conditioning system 30, and/or alternative power supplies 50. As a result, in particular embodiments, air-conditioning system 10 may provide additional benefits from control module 40 coordinating operation of these elements, managing these elements in accordance with certain goals or policies, and/or adjusting their operation in response to certain events.

As one example, control module 40 may be configured to manage the operation of main conditioning system 20 and secondary conditioning system 30 based on targets for certain environmental parameters associated with first space 14, such as temperature, humidity, or appropriate air-quality measurements. Thus, in particular embodiments, control module 40 may activate secondary conditioning system 30 in response to determining that a temperature associated with first space 14 is greater than a predetermined target temperature or in response to determining that the difference between the relevant temperature and a target temperature is greater than a predetermined threshold. In such embodiments, the operation of secondary conditioning system 30 may be more energy-efficient than the operation of main conditioning system 20 and secondary conditioning system's cooling effect on first space 14 may be significant enough that operating secondary conditioning system 30 in conjunction with main conditioning system 20 may be more cost- or energy-efficient than attempting to condition the air in first space 14 using main conditioning system 20 alone.

Alternatively, in particular embodiments, secondary conditioning system 30 may be configured to run continuously while main conditioning system 20 may be configured to only turn on if particular conditions are satisfied (e.g., the temperature of first space 14 exceeds some limit). In such embodiments, secondary conditioning system 30 may likewise be more energy efficient in operation than main conditioning system 20. As a result, the continuous operation of secondary conditioning system 30 may provide cost or energy savings by limiting the amount of time or number of times that main conditioning system 20 is activated.

As another example, control module 40 may be configured to intelligently manage the use of alternative power supplies 50. In particular embodiments, control module 40 may be capable of controlling a switch 54 to switch secondary conditioning system 30 between multiple alternative power supplies 50 or between public power grid connection 52 and one or more alternative power supplies 50. As indicated above, control module 40 may be configured to select an appropriate power supply for secondary conditioning system 30 based on certain trigger events, such as certain environmental parameters being satisfied, or according to a predetermined schedule. For example, in particular embodiments, control module 40 may be capable of detecting the availability of alternative power provided by alternative power supplies 50 and activating switch 54 (or other appropriate hardware and/or software components) to connect secondary conditioning system 30 to an alternative power supply 50. Control module 40 may also be capable of activating switch 54 to connect secondary conditioning system 30 to an alternative power supply 50 according to a predetermined schedule that takes into account, for example, expected availability of power from various different alternative power supplies 50. For solar power in particular, this may permit control module 40 to make use of a solar alternative power supply 50 when solar power is most plentiful and cooling is likely to be most needed. In addition, control module 40 may be capable of operating switch 54 to selectively connect a battery (such as alternative power supply 50c in FIG. 1) to any of alternative power supplies 50, so that the battery can be charged when power is available from the relevant alternative power supply 50.

As yet another example, control module 40 may be capable of managing the operation of air-conditioning system 10, secondary conditioning system 30, switch 54, and/or alternative based on utility rate information stored or accessed by control module 40. For example, control module 40 may turn main conditioning system 20 or secondary conditioning system 30 on or off based on rates associated with power provided by the public power grid or any alternative power supplies 50. Similarly, control module 40 may selectively connect secondary conditioning system 30 to a particular alternative power supply 50 based on rates associated with public power grid so that secondary conditioning system 30 can utilize alternative power supplies 50 when rates for power supplied by the public power grid exceed certain thresholds. Additionally, control module 40 may selectively connect a battery to the public power grid connection 52 to allow the battery to charge for later use when rates are below a certain threshold.

As another example, control module 40 may also be capable of collecting historical data on the operation of air-conditioning system 10 and/or the conditions within structure 12. In such embodiments, control module 40 may be further capable of utilizing the collected data to manage operation of the various components of air-conditioning system 10. Examples of such historical data include, but are not limited to, energy usage of main conditioning system 20 and secondary conditioning system 30, historical availability of renewable energy from alternative power supplies 50, temperature or other environmental changes resulting from the operation of main conditioning system 20 and/or secondary conditioning system 30. Control module 40 may store this data for subsequent use by control module 40, for display to a user, or for any other suitable purpose.

Additionally, in particular embodiments, control module 40 may determine optimal operational parameters for air-conditioning system 10 based on this stored data. For example, if renewable energy is not available from alternative power supplies 50 at a given point in time, control module 40 may determine based on historical data on temperature and/or humidity changes resulting from the activation of secondary conditioning system 30 when to activate secondary conditioning system 30 using power from public power grid connection 52. In particular embodiments, this may permit control module 40 to decide based on historical data, how frequently to activate secondary conditioning system 30 when power from alternative power supplies 40 is not available, when power from alternative power supplies 50 is available in limited quantity, or when the state of alternative power supplies 40 satisfies any other appropriate condition.

Thus, in particular embodiments, cool, dehumidified air may be provided to second space 16 (such as an attic) by secondary conditioning system 30 using renewable energy sources. Because second space 16 is sealed, second space 16 may serve as a storage area for this conditioned air, trapping a supply of conditioned air against ceiling 62 separating second space 16 and first space 14. As thermal energy propagates through ceiling 62 and as air seeps through holes and breaches in ceiling 62, this supply of conditioned air in second space 16 may significantly aid conditioning of air in first space 14.

As a result, the installation and use of air-conditioning system 10 in structure 12 may provide improved air-conditioning performance in first space 14. Additionally, the installation and use of secondary conditioning system 30 can result in cost and energy savings for the purchase or operation of main conditioning system 20. Furthermore, conditioning of air in second space 16 may prevent mold, limit decay, and improve air quality in second space 16. Intelligent management of main conditioning system 20, secondary conditioning system 30, and/or alternative power supplies 50 by control module 40 may also provide further cost or energy savings. As a result, the installation and use of air-conditioning system 10 may provide numerous benefits. However, various embodiments of air-conditioning system 10 may offer all, some, or none of these advantages.

Figure 2:
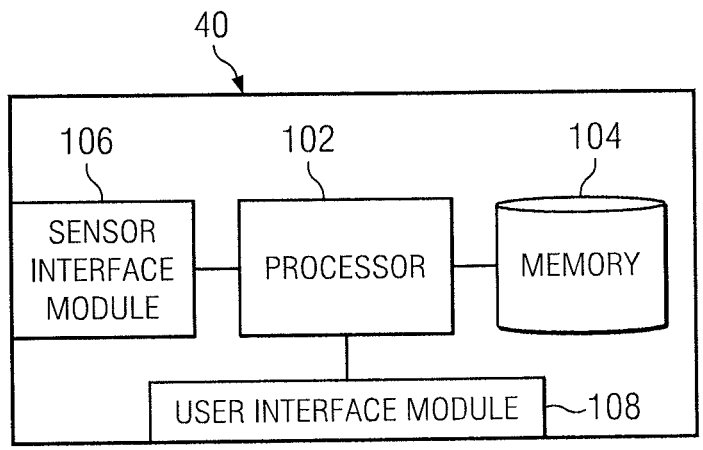
FIG. 2 is a block diagram of a control module utilized by particular embodiments of the air-conditioning system.

FIG. 2 illustrates control module 40 according to a particular embodiment of air-conditioning system 10. In the illustrated example, control module 40 includes a processor 102, memory 104, a sensor interface module 106, and a user interface module 108.

Processor 102 may represent or include any form of processing component, including general purpose computers, dedicated microprocessors, or other processing devices capable of processing electronic information. Examples of processor 102 include digital signal processors (DSPs), application-specific integrated circuits (ASICs), field-programmable gate arrays (FPGAs), and any other suitable specific or general purpose processors. Although FIG. 2 illustrates a particular embodiment of control module 40 that includes a single processor 102, control module 40 may, in general, include any suitable number of processors 102.

Memory 104 stores processor instructions, historical operating and environmental data, rate information, and/or settings and parameters utilized by control module 40 during operation. Memory 104 may comprise any collection and arrangement of volatile or non-volatile, components suitable for storing data, such as for example random access memory (RAM) devices, read only memory (ROM) devices, magnetic storage devices, optical storage devices, or any other suitable data storage devices. In particular embodiments, memory 104 may represent, in part, computer-readable media on which computer instructions are encoded. In such embodiments, some or all the described functionality of control module 40 may be provided by processor 102 executing the instructions encoded on the described media. Although shown in FIG. 2 as a single component, memory 104 may represent any number of memory elements within, local to, or remotely accessible by control module 40.

Sensor interface module 106 receives signals from sensors that collect information pertaining to various aspects of the air in first space 14 and second space 16; the availability of power from alternative power supplies 50; the operation or status of main conditioning system 20, secondary conditioning system 30, or other components of air-conditioning system 10; and/or any other appropriate information that may be used by control module 40 during operation of air-conditioning system 10. Sensor interface module 106 may represent any appropriate combination of hardware and/or software suitable to provide the described functionality. In particular embodiments, sensor interface module 106 includes or represents a multiplexer capable of selectively providing to processor 102 signals from one of a plurality of sensors. Additionally, in particular embodiments, sensor interface module 106 represents, in part or in whole, a software application being executed on processor 102.

User interface module 108 receives input from a user of air-conditioning system 10 regarding target temperatures, operating schedules, power rate thresholds, and any other appropriate information related to the operation of air-conditioning system 10. User interface module 108 may also provide a user information regarding the operation or status of main conditioning system 20, secondary conditioning system 30, or alternative power supplies 50; the availability of power from one or more alternative power supply 50; current power usage; and/or any other appropriate information regarding the operation of air-conditioning system 10. User interface module 108 may include any suitable combination of input devices, such as buttons, dials, keypads, and toggle switches, and may include any suitable combination of output components, such as light emitting diodes (LEDs), a discrete display, speakers, and gauges. Although shown in FIG. 2 as separate, distinct components, user interface module 108 and sensor interface module 106 may include one or more common components. Additionally, in particular embodiments, user interface module 108 represents, in part or in whole, a software application being executed on processor 102.

Figure 3:
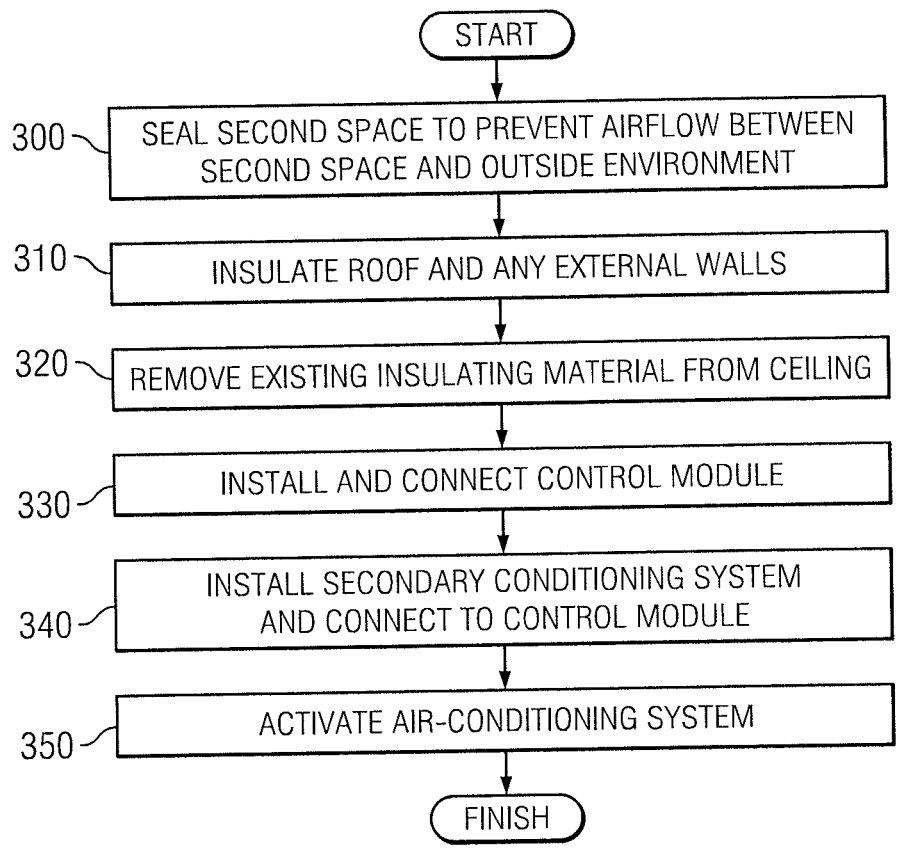
FIG. 3 is a flowchart detailing an example technique for installing a particular embodiment of the air-conditioning system.

FIG. 3 is a flowchart illustrating an example technique for installing air-conditioning system 10 in a structure such as structure 12. In the described example, air-conditioning system 10 is installed as part of a retrofit to an existing air-conditioning system that, for purposes of this example, is assumed to already include an existing main conditioning system 20. The steps illustrated in FIG. 3 may be combined, modified, or deleted where appropriate, and additional steps may also be added to those shown. Additionally, the steps may be performed in any suitable order without departing from the scope of the present disclosure.

The installation process begins at step 300 with second space 16 being sealed to prevent airflow between second space 16 and an outside environment external to structure 12. This sealing step may include, for example, covering or removing vents (such as soffit vents), adding drywall or other materials to roof 60 or any external walls 19 of attic space, or applying chemical sealants to appropriate surfaces of second space 16. In general, second space 16 may be sealed using any appropriate techniques and materials.

At step 310, the attic-side of roof 60 and the attic-side of any external walls 19 of second space 16 are insulated with insulating material 64. As noted above, insulating material 64 may represent any appropriate material capable of impeding or preventing the transfer of heat through the surface on which it is installed or to which it is applied. In particular embodiments, insulating material 64 represents conventional fiberglass panels. However, under certain circumstances, spray foam insulation may be a particularly suitable insulating material 64 as spray foam insulation may be more easily applied to the irregularly-shaped surfaces of second space 16 and may also fill in cracks and crevices in roof 60 or external walls 19 of second space 16 thereby helping seal second space 16.

In particular embodiments, if existing insulating material 64 is installed on or in ceiling 62, this existing insulating material 64 may be removed from the attic-side of ceiling 62 of structure 12, at step 320, to permit the transfer of thermal energy between first space 14 and second space 16. However, depending on the structure and composition of ceiling 62, this may not be possible or desirable. Additionally, in particular embodiments, air-conditioning system 10 may be installed during construction of structure 12 and no existing insulating material 64 may be present in or on ceiling 62.

At step 330, control module 40 is installed and appropriately connected to any previously-installed elements of air-conditioning system 10, such as main conditioning system 20. At step 340, secondary conditioning system 30 is installed and connected to control module 40. Installation of secondary conditioning system 30 may include any appropriate steps depending on the configuration and capabilities of secondary conditioning system 30. In particular embodiments, installation of secondary conditioning system 30 includes fluidly connecting secondary conditioning system 30 to second space 16. At step 350, air-conditioning system 10 is activated and installation ends as shown in FIG. 3.

Figure 4:
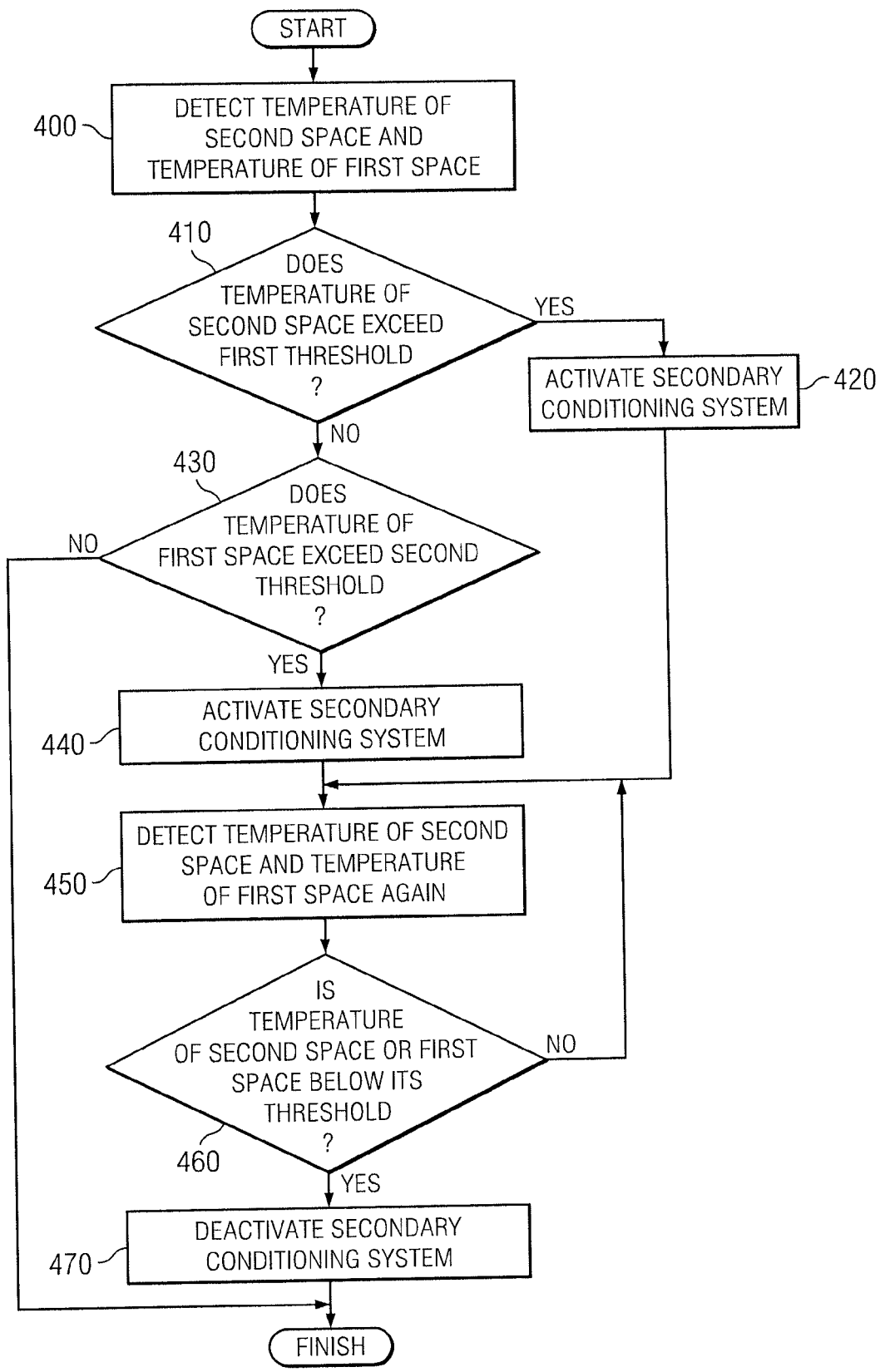
FIG. 4 is a flowchart detailing example operation of a particular embodiment of the air-conditioning system.

FIG. 4 is a flowchart illustrating example operation of a particular embodiment of air-conditioning system 10. In particular, FIG. 4 describes an embodiment in which secondary conditioning system 30 is activated when the temperatures in second space 16 and/or first space 14 exceed predetermined thresholds. Depending on the configuration of air-conditioning system 10, the steps described below may be completed by a user of air-conditioning system 10 or by an automated component of air-conditioning system 10 (such as control module 40), or any appropriate combination thereof. The steps illustrated in FIG. 4 may be combined, modified, or deleted where appropriate, and additional steps may also be added to those shown. Additionally, the steps may be performed in any suitable order without departing from the scope of the present disclosure.

Operation of air-conditioning system 10 begins at step 400 with air-conditioning system 10 detecting a temperature associated with second space 16 and a temperature associated with first space 14. At step 410, air-conditioning system 10 determines whether the temperature of second space 16 exceeds a first threshold. If so, air-conditioning system 10 activates secondary conditioning system 30, at step 420, and operation continues at step 450.

If not, air-conditioning system 10 determines whether the temperature of first space 14 exceeds a second threshold at step 430. If so, air-conditioning system 10 activates secondary conditioning system 30, at step 440, and operation continues at step 450. If not, operation of air-conditioning system 10 may end as shown in FIG. 4, or air-conditioning system 10 may continue monitoring the temperature of second space 16 and first space 14, returning to step 400.

When activated secondary conditioning system 30 may supply cool, dehumidified air to second space 16. Because second space 16 is sealed, second space 16 may serve as a storage area for this conditioned air, trapping a supply of conditioned air against ceiling 62. As thermal energy propagates through ceiling 62 and as air seeps through holes and breaches in ceiling 62, this supply of conditioned air in second space 16 may significantly aid in conditioning the air in first space 14.

Once secondary conditioning system 30 has been activated, secondary conditioning system 30 may, depending on the configuration of air-conditioning system 10, continue to run indefinitely or until any appropriate event or events occur. For example, in the illustrated embodiment, secondary conditioning system 30 continues to run until a temperature associated with second space 16 is below a specific threshold or until a temperature associated with first space 14 is below a specific threshold. Thus, at step 450, air-conditioning system 10 detects the temperature associated with second space 16 and the temperature associated with first space 14. At step 460, air-conditioning system 10 determines whether the temperature of second space 16 is below a third threshold or the temperature of first space 14 is below a fourth threshold. If neither condition is satisfied, operation returns to step 450 and air-conditioning system 10 continues monitoring the temperatures of second space 16 and first space 14. If either of the relevant temperatures is below its corresponding threshold, air-conditioning system 10 deactivates secondary conditioning system 30 at step 470. Operation of air-conditioning system 10 may then terminate as shown in FIG. 4 or air-conditioning system 10 may continue monitoring the temperatures of second space 16 and first space 14, returning to step 400.

Although the present disclosure describes or suggests several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system for conditioning air in a structure, comprising:
a first conditioning system operable to supply conditioned air to an inhabited space of a structure, wherein the inhabited space is enclosed, at least in part, by one or more external walls;
a second conditioning system operable to supply conditioned air to an attic space of the structure located above the inhabited space, the second conditioning system operable to dehumidify air within the attic space when supplying the conditioned air to the attic space, wherein the attic space is enclosed, at least in part, by a roof that is sealed to prevent a flow of gas between the attic space and an outside environment, and wherein the inhabited space and the attic space are separated by a ceiling that permits thermal energy to pass between the inhabited space and the attic space, the ceiling comprising a material having a thermal resistance of less than 5 $ft^2 \cdot F \cdot h/Btu$;
a control module operable to:
activate the second conditioning system in response to a determination that a temperature associated with the inhabited space exceeds a threshold temperature;
measure a change in temperature within the structure resulting from activation of the second conditioning system;
measure energy usage associated with activation of the first conditioning system or the second conditioning system;
store data recording the measurements;
determine an availability of power from an alternative power supply, the alternative power supply comprising a photovoltaic cell, a wind turbine, or a battery; and
determine whether to activate the second conditioning system based on the availability of power and the stored data; and a device operable to selectively couple the second conditioning system to a public power supply and the alternative power supply, wherein the alternative power supply is operable to supply the second conditioning system with power from a renewable source.

2. The system of claim 1, wherein the attic space stores cooled air supplied by the second conditioning system, and wherein the cooled air absorbs thermal energy passing through the ceiling from the inhabited space.

3. The system of claim 1, wherein the battery is operable to store electric charge and supply electrical power to the second conditioning system.

4. The system of claim 1, wherein the control module is further operable to:
   detect a trigger event associated with the alternative power supply; and
   in response to detecting the trigger event, couple the second conditioning system to the alternative power supply.

5. The system of claim 4, wherein detecting the trigger event comprises determining the current time.

6. The system of claim 4, wherein detecting the trigger event comprises determining an amount of power being generated by the alternative power supply.

7. A method for conditioning air in a structure, comprising:
   activating a first conditioning system operable to supply conditioned air to an inhabited space of a structure that is enclosed, at least in part, by one or more external walls;
   activating a second conditioning system operable to supply conditioned air to an attic space of the structure located above the inhabited space, the second conditioning system operable to dehumidify air within the attic space when supplying the conditioned air to the attic space, wherein the attic space is enclosed, at least in part, by a roof that is sealed to prevent a flow of gas between the attic space and an outside environment, and wherein the inhabited space and the attic space are separated by a ceiling that permits thermal energy to pass between the inhabited space and the attic space, the ceiling comprising a material having a thermal resistance of less than 5 $ft^2 \cdot F \cdot h/Btu$;
   measuring a change in temperature within the structure resulting from activation of the second conditioning system;
   measuring energy usage associated with activation of the first conditioning system or the second conditioning system;
   storing data recording the measurements; and
   determining an availability of power from an alternative power supply, the alternative power supply comprising a photovoltaic cell, a wind turbine, or battery;
   selectively coupling the second conditioning system to a public power supply and the alternative power supply, wherein the alternative power supply is operable to supply the second conditioning system with power from a renewable source;
   wherein activating the second conditioning system comprises activating the second conditioning system based on one or more of:
      a determination that a temperature associated with the inhabited space exceeds a threshold temperature; and
      the availability of power from the alternative power supply and the stored data.

8. The method of claim 7, wherein selectively coupling the second conditioning system to one of the public power supply and the alternative power supply comprises:
   detecting a trigger event associated with the alternative power supply; and
   in response to detecting the trigger event, coupling the second conditioning system to the alternative power supply.

9. The method of claim 8, wherein detecting the trigger event comprises determining the current time.

10. The method of claim 8, wherein detecting the trigger event comprises determining an amount of power being generated by the alternative power supply.

11. A method comprising:
   fluidly connecting a first conditioning system to an inhabited space of a structure that is enclosed, at least in part, by one or more external walls, the first conditioning system operable to supply conditioned air to the inhabited space;
   sealing an attic space located above the inhabited space to prevent a flow of air between the attic space and an outside environment;
   fluidly connecting a second conditioning system to the attic space, the second conditioning system operable to dehumidify air within the attic space when supplying conditioned air to the attic space, wherein the inhabited space and the attic space are separated by a ceiling that permits thermal energy to pass between the inhabited space and the attic space, the ceiling comprising a material having a thermal resistance of less than 5 $ft^2 \cdot F \cdot h/Btu$; and
   coupling a control module to the second conditioning system, the control module operable to:
      activate the second conditioning system in response to a determination that a temperature associated with the inhabited space exceeds a threshold temperature;
      measure a change in temperature within the structure resulting from activation of the second conditioning system;
      store data recording the measured change in temperature;
      determine an availability of power from an alternative power supply, the alternative power supply comprising a photovoltaic cell, a wind turbine, or a battery;
      selectively couple the second conditioning system to a public power supply and the alternative power supply, wherein the alternative power supply is operable to supply the second conditioning system from a renewable source; and
      determine whether to activate the second conditioning system based on the availability of power and the stored data.

* * * * *